United States Patent
Nagata et al.

(10) Patent No.: US 9,116,385 B2
(45) Date of Patent: Aug. 25, 2015

(54) LIGHT SOURCE UNIT BASE MATERIAL, LIGHTING DEVICE, DISPLAY DEVICE AND TELEVISION RECEIVER

(75) Inventors: Katsunori Nagata, Osaka (JP); Yoshinori Ohhashi, Osaka (JP); Takayuki Komai, Osaka (JP); Ryuhei Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 769 days.

(21) Appl. No.: 13/508,048

(22) PCT Filed: Oct. 21, 2010

(86) PCT No.: PCT/JP2010/068566
§ 371 (c)(1),
(2), (4) Date: May 4, 2012

(87) PCT Pub. No.: WO2011/055635
PCT Pub. Date: May 12, 2011

(65) Prior Publication Data
US 2012/0218479 A1 Aug. 30, 2012

(30) Foreign Application Priority Data
Nov. 9, 2009 (JP) ................................ 2009-256203

(51) Int. Cl.
*G02F 1/1335* (2006.01)

(52) U.S. Cl.
CPC .................. *G02F 1/133603* (2013.01); *G02F 2001/133612* (2013.01); *Y10T 29/49117* (2015.01)

(58) Field of Classification Search
CPC ....................................................... G09F 9/33
See application file for complete search history.

(56) References Cited

U.S. PATENT DOCUMENTS

2002/0097350 A1* 7/2002 Haven et al. .................... 349/43
2008/0259252 A1 10/2008 Tanaka et al.
2009/0316090 A1* 12/2009 Fujikawa et al. ............. 349/110

FOREIGN PATENT DOCUMENTS

| JP | 2007-115550 A | 5/2007 |
| JP | 2007-317423 A | 12/2007 |
| JP | 2008-269947 A | 11/2008 |

OTHER PUBLICATIONS

Official Communication issued in International Patent Application No. PCT/JP2010/068566, mailed on Dec. 21, 2010.

* cited by examiner

*Primary Examiner* — Mary Ellen Bowman
(74) *Attorney, Agent, or Firm* — Keating & Bennett, LLP

(57) ABSTRACT

A light source unit base material for manufacturing a plurality of light source units includes a board base material formed in substantially a rectangular shape, and a plurality of light sources provided on the board base material in a row direction and in a column direction and connected electrically in series in the row direction and in the column direction.

9 Claims, 10 Drawing Sheets

FIG.1
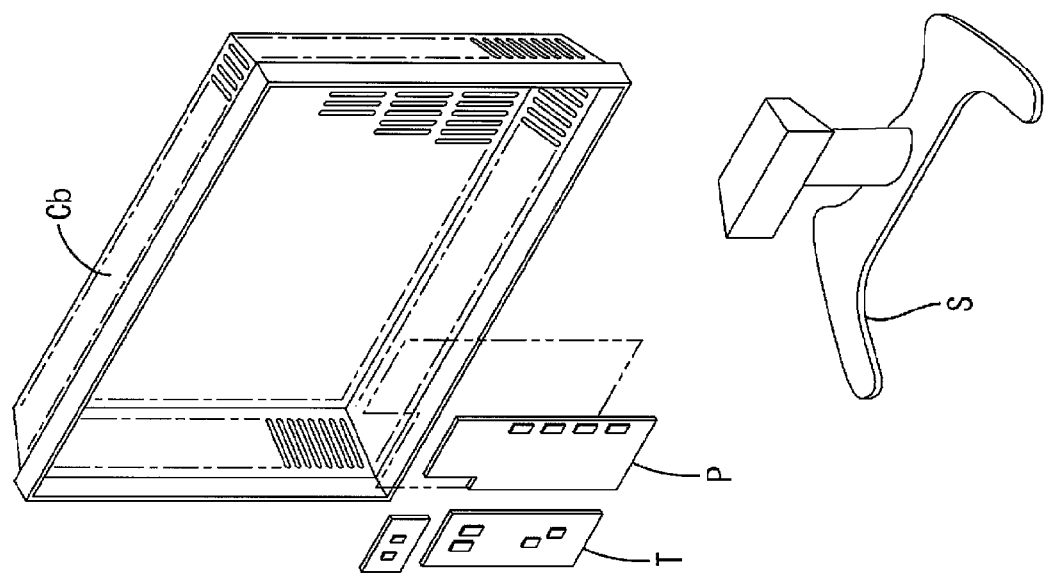
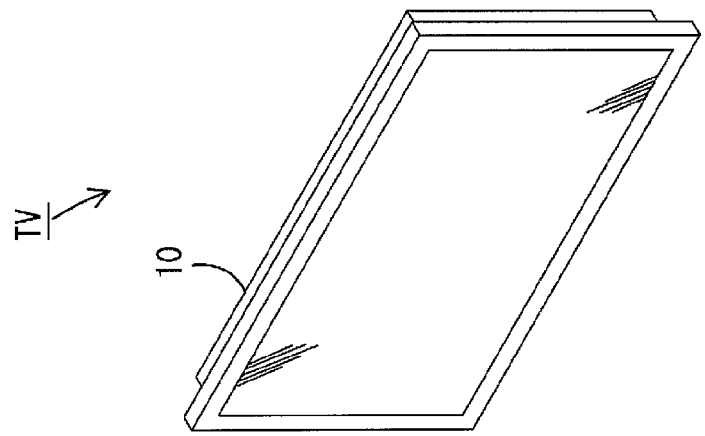
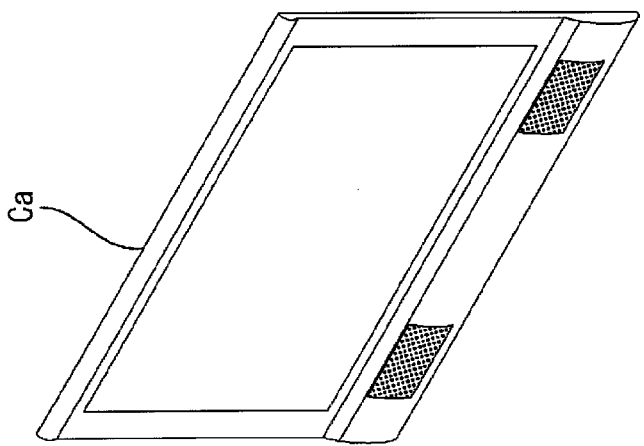

LIGHT SOURCE UNIT BASE MATERIAL, LIGHTING DEVICE, DISPLAY DEVICE AND TELEVISION RECEIVER

TECHNICAL FIELD

The present invention relates to a light source unit base material, a lighting device, a display device and a television receiver.

BACKGROUND ART

In recent years, a type of an image display device including a television receiver has been shifted from a conventional CRT display device to a thin display device using a thin display element such as a liquid crystal panel and a plasma display. A liquid crystal panel used as a display element does not emit light, and thus a backlight device is required as a separate lighting device. A backlight device disclosed in Patent Document 1 has been known. The backlight device disclosed in Patent Document 1 includes a light source unit including an elongated base board and a plurality of LEDs (light sources) that are linearly arranged on the base board. A plurality of the light source units are arranged to achieve two-dimensional arrangement of the light sources.

Patent Document 1: Japanese Unexamined Patent Publication No. 2007-317423

Problem to be Solved by the Invention

In manufacturing image display devices having various display sizes, a light source unit corresponding to each display size has been required to be prepared. This increases manufacturing cost, and improvement is required to be made in this point.

DISCLOSURE OF THE PRESENT INVENTION

The present invention was accomplished in view of the above circumstances. It is an object of the present invention to provide a light source unit base material for manufacturing light source units having different sizes. Another object of the present invention is to provide a lighting device, a display device and a television receiver having the light source unit.

Means for Solving the Problem

To solve the above problem, a light source unit base material for manufacturing a plurality of light source units includes a board base material formed in substantially a rectangular shape, and a plurality of light sources provided on the board base material in a row direction and in a column direction and connected electrically in series in the row direction and in the column direction.

A light source unit base material of the present invention is divided into light source units by cutting along a line between adjacent light sources in a board base material. Such a configuration allows light source required for a plurality of light source units to be mounted collectively, and improves an operation property in manufacturing. In the present invention, light sources are connected in series in both row and column directions. The light source units in each of which the light sources are connected in series can be manufactured by cutting the board base material in either one of the row direction and the column direction. Accordingly, directions for cutting one light source unit base material are selected. This allows two types of light source unit extending in the row or column direction to be selectively manufactured. The light source units that are formed by dividing the light source unit base material is cut at any length, and accordingly the length of the light source unit can be adjusted. Thus, light source units having plural sizes can be manufactured from one type of the light source unit base material. This reduces the manufacturing cost.

The light sources are light emitting diodes, the light emitting diodes that are provided in the column direction configure a light emitting diode group, the light emitting diode group includes a first light emitting diode group and a second first light emitting diode group, anodes of the light emitting diodes are directed to one side in the column direction in the first light emitting diode group, cathodes of the light emitting diodes are directed to the one side in the column direction in the second light emitting diode group, and the first light emitting diode group and the second light emitting diode group are arranged alternately in the row direction.

With such a configuration, an anode of a light emitting diode and a cathode of another light emitting diode can be closer to each other among the light emitting diodes of light emitting diode groups arranged in the column direction, and a wiring path for serial connection can be shortened. Furthermore, even if an anode of a light emitting diode and a cathode of another light emitting diode can be closer to each other among the adjacent light emitting diodes in the row direction. Therefore, the wiring path for serial connection can be shortened.

The board base material can be a flexible base member. This allows the light source unit base material and eventually a divided light source unit to be rolled like a reel shape, and it is easy to handle the light source unit base material and the divided light source unit.

Next, to solve the above problem, a lighting device of the present invention may include the light source unit obtained by dividing the light source unit base material and a chassis on which the light source unit is mounted.

Next, to solve the above problem, a display device of the present invention may include the above lighting device and a display panel configured to provide display using light from the lighting device.

The display panel may be a liquid crystal panel. The display device as a liquid crystal display device has a variety of applications, such as a television display or a personal-computer display. Particularly, it is suitable for a large screen display.

Next, to solve the above problem, a television receiver of the present invention may include the above display device.

Advantageous Effect of the Invention

According to the present invention, a light source unit base material for manufacturing light source units having different sizes, a lighting device, a display device and a television receiver having the light source unit can be provided.

BRIEF DESCRIPTION OF THE DRAWINGS

FIG. 1 is an exploded perspective view illustrating a general configuration of a television receiver according to a first embodiment of the present invention;

BEST MODE FOR CARRYING OUT THE INVENTION

An embodiment of the present invention will be described with reference to FIGS. 1 to 10. In the present embodiment, a liquid crystal display device 10 will be explained. An X axis, a Y-axis and a Z-axis are described in a part of the drawings, and a direction of each axial direction corresponds to a direction described in each drawing. An upper side in FIGS. 4 and 5 corresponds to a front-surface side and a lower side in FIGS. 4 and 5 corresponds to a rear-surface side.

Figure 2:
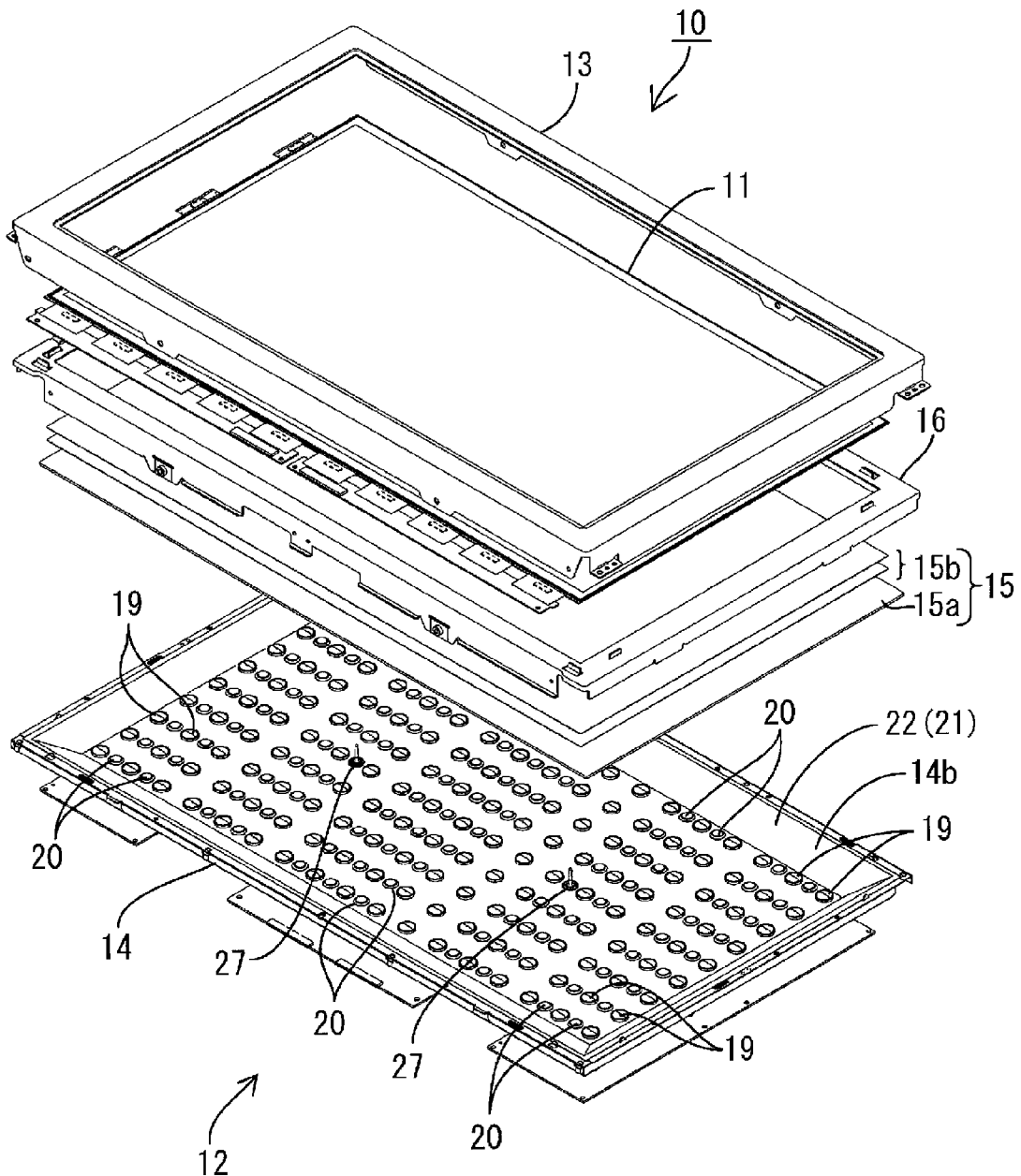
FIG. 2 is an exploded perspective view illustrating a general configuration of a liquid crystal display device included in the television receiver in FIG. 1.

As illustrated in FIG. 1, a television receiver TV of the present embodiment includes a liquid crystal display device 10, front and rear cabinets Ca, Cb which house the liquid crystal display device 10 therebetween, a power source P, a tuner T and a stand S. An entire shape of the liquid crystal display device (display device) 10 is a landscape rectangular. The liquid crystal display device 10 is housed in a vertical position. As illustrated in FIG. 2, the liquid crystal display device 10 includes a liquid crystal panel 11 as a display panel, and a backlight device (lighting device) 12 as an external light source. The liquid crystal panel 11 and the backlight device 12 are integrally held by a frame shaped bezel 13 and the like. In the present embodiment, a display size is 42 inches and an aspect ratio is 16:9.

Next, the liquid crystal panel 11 and the backlight device 12 included in the liquid crystal display device 10 will be described. The liquid crystal panel (display panel) 11 is formed in a rectangular shape with a plan view and is configured such that a pair of glass substrates is bonded together with a predetermined gap therebetween and liquid crystal is sealed between the glass substrates. On one of the glass substrates, switching components (e.g., TFTs) connected to source lines and gate lines which are perpendicular to each other, pixel electrodes connected to the switching components, and an alignment film and the like are provided. On the other substrate, color filters having color sections such as R (red), G (green) and B (blue) color sections arranged in a predetermined pattern, counter electrodes, and an alignment film and the like are provided. Polarizing plates are attached to outer surfaces of the substrates.

The backlight device 12 will be explained in detail. The backlight device 12 is a direct type backlight device in which a plurality of LED units U are provided directly below the back of the panel (display) face of the liquid crystal panel 11. As illustrated in FIG. 2, the backlight device 12 includes a chassis 14, an optical sheet set 15 (a diffuser 15a, and a plurality of optical sheets 15b which is provided between the diffuser 15a and the liquid crystal panel 11), a frame 16, and a reflection sheet 21. The chassis 14 has a substantially box-shape and has an opening 14b on the light exit side (on the liquid crystal panel 11 side). The optical sheet set 15 is provided so as to cover the opening 14b of the chassis 14. The frame 16 provided along an outer edge of the chassis 14 holds an outer edge of the optical sheet set 15 such that the outer edge is sandwiched between the frame 16 and the chassis 14. The reflection sheet 21 reflects light in the chassis 14 to the optical member 15 side.

Furthermore, the chassis 14 houses a plurality of LED units U therein and includes holding members 20. Each of the LED units (light source units) U includes LEDs 17 (light emitting diodes) as a light source. Holding members 20 are provided to hold the LED units U to the chassis 14. In the backlight device 12, a light exit side is the side closer to the optical member 15 side (front surface side) from the LED units U. In the following, each component of the backlight device 12 will be explained.

Figure 3:
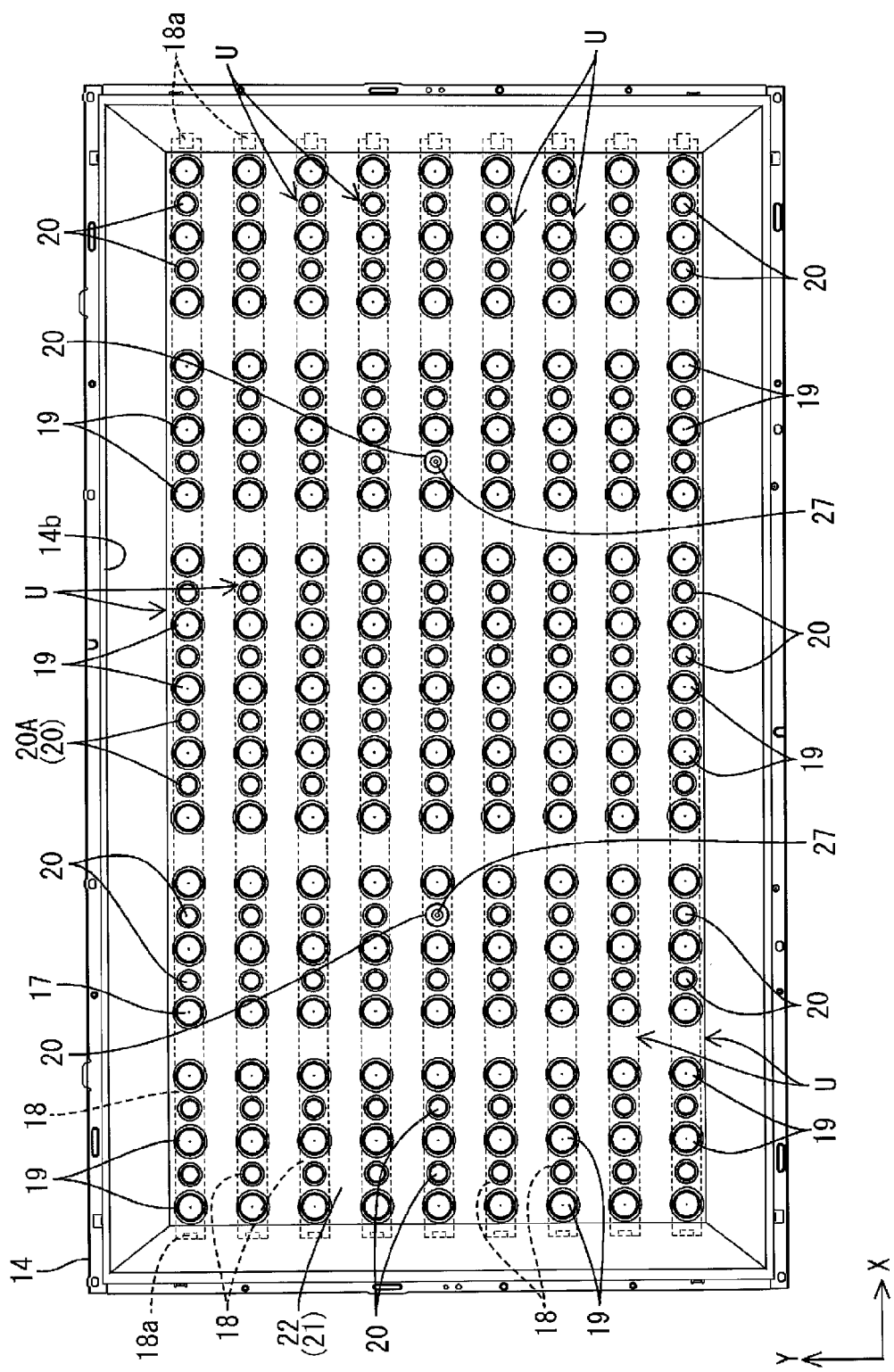
FIG. 3 is a plan view illustrating a backlight device included in the liquid crystal display in FIG. 2.
Figure 4:
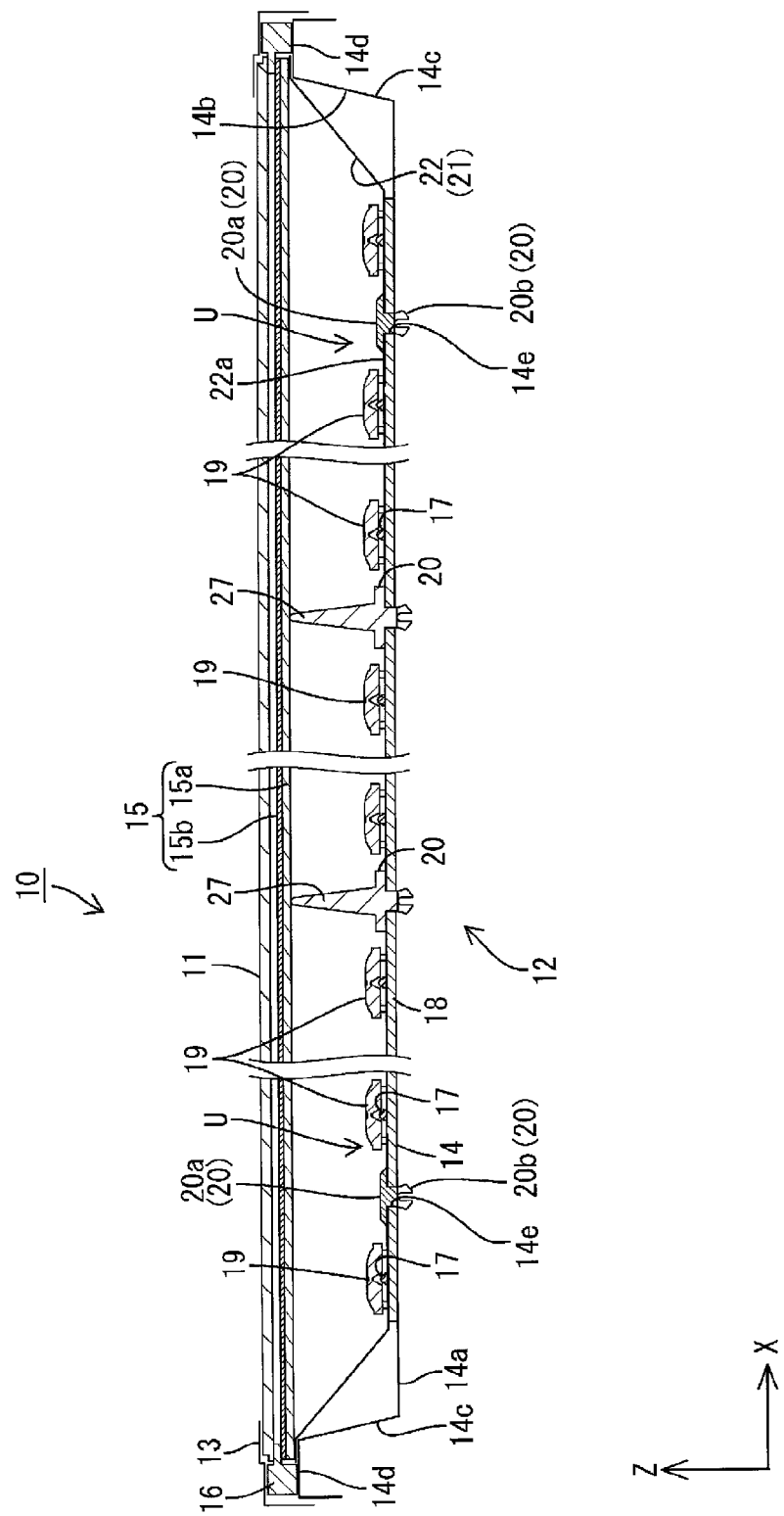
FIG. 4 is a cross-sectional view illustrating a sectional configuration taken along a long side of the liquid crystal display device in FIG. 2.
Figure 5:
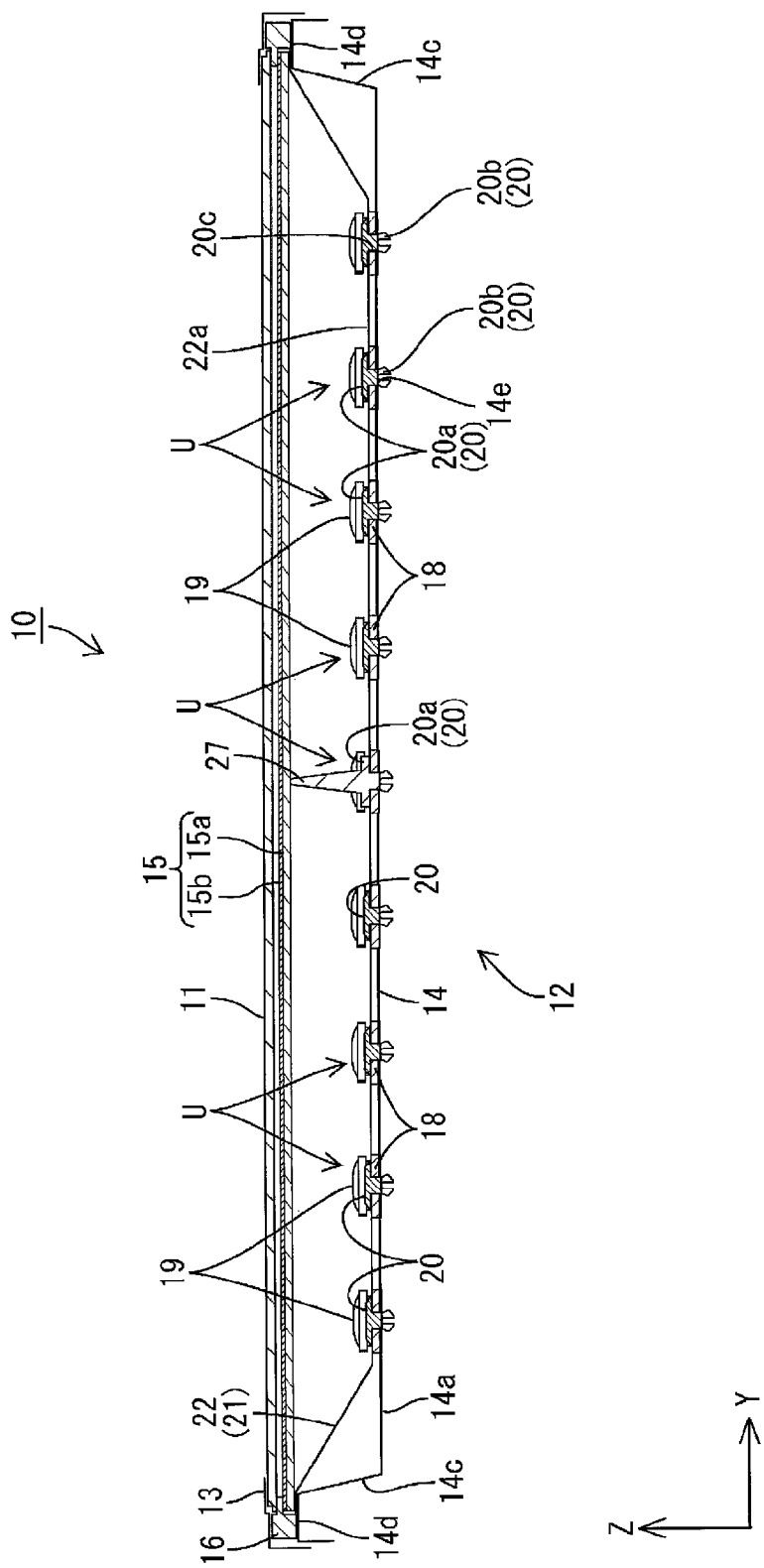
FIG. 5 is a cross-sectional view illustrating a sectional configuration taken along a short side of the liquid crystal display device in FIG. 2.

The chassis 14 is made of metal. As illustrated in FIGS. 3 to 5, the chassis 14 includes a rectangular bottom plate 14a like the liquid crystal panel 11, side plates 14c each of which rises from an outer edge of the corresponding side of the bottom plate 14a, and a receiving plate 14d outwardly extending from a rising edge of each of the side plates 14c. An entire shape of the chassis 14 is a substantially shallow box shape (shallow plate shape) opened to the front surface side. A long side of the chassis 14 matches an X-axis direction (a horizontal direction) and a short side thereof matches a Y-axis direction (a vertical direction). The frame 16 and an optical member 15 that will be described later can be placed on the receiving plate 14c of the chassis 14 from the front-surface side. The frame 16 is fixed to each receiving plate 14c by screws.

As illustrated in FIG. 2, the optical member 15 is formed in a rectangular landscape with a plan view like the liquid crystal panel 11 and the chassis 14. As illustrated in FIGS. 4 and 5, the outer edge of the optical member 15 is placed on the receiving plate 14d so as to cover the opening 14b of the chassis 14 and provided between the liquid crystal panel 11 and the LED units U.

The optical member 15 includes a diffuser 15a and an optical sheet 15b. The diffuser 15a is provided on the rear-surface side (the LED unit U side, a side opposite from the light exit side) and the optical sheet 15b is provided on the front-surface side (the liquid crystal panel 11 side, the light exit side). The diffuser 15a includes a base member having a thickness and made of a substantially transparent synthetic resin and light scattering particles dispersed in the base member. The diffuser 15a has a function for diffusing light that transmitting therethrough. The optical sheet 15b is formed in a sheet having a thickness smaller than the diffuser 15a. A specific optical sheet 15b may include a diffuser sheet, a lens sheet, a reflecting type polarizing sheet, and any one of them may be selected to be used.

As illustrated in FIG. 2, the frame 16 is formed in a frame shape along an outer peripheral part of the liquid crystal panel 11 and the optical member 15. The frame 16 and each receiving plate 14d hold the outer peripheral part of the optical member 15 therebetween (FIGS. 4 and 5). The frame 16 receives a rear surface of the outer peripheral part of the liquid crystal panel 11 and the frame 16 and the bezel 13 that is provided on the front-surface side of the liquid crystal panel 11 hold the outer peripheral part of the liquid crystal panel 11 therebetween (FIGS. 4 and 5).

The reflection sheet 21 includes a chassis reflection sheet 22 and a board reflection sheet 23. The reflection sheet 22 covers almost entire inner surface of the chassis 14. The board reflection sheet 23 covers independently each LED board 18.

The board reflection sheet 23 is a component of the LED unit U which will be explained in detail later. The chassis reflection sheet 22 will be explained in detail.

Figure 6:
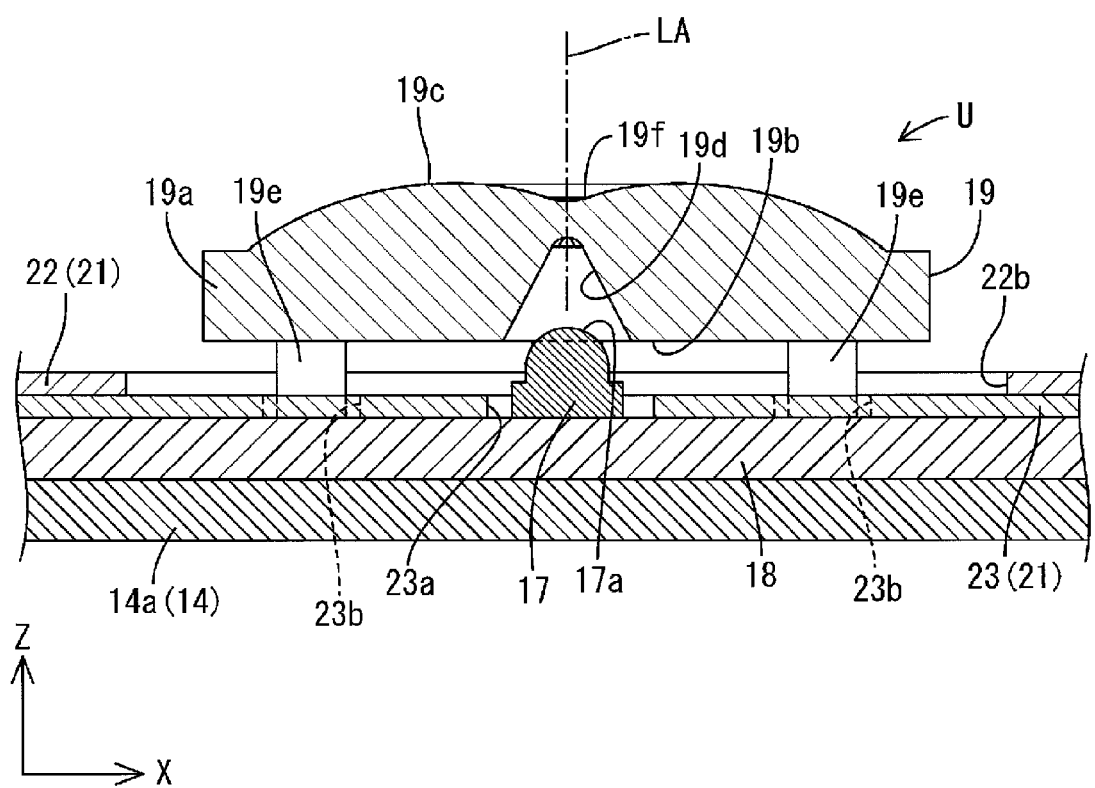
FIG. 6 is an exploded sectional view of the surroundings of an LED in FIG. 4.

The chassis reflection sheet 22 is made of a synthetic resin, and has a surface having white color that provides excellent light reflectivity. As illustrated in FIG. 3, the chassis reflection sheet 22 extends along an inner surface of the chassis 14. Almost entire area of a middle portion extending along the bottom plate 14a of the chassis 14 is a main body 22a. Lens fitting holes 22b that are through holes are formed in the main body 22a such that a diffuser lens 19 is fitted therethrough. The diffuser lenses 19 are provided in the LED unit U in the chassis 14. The lens fitting holes 22b are formed in a matrix so as to correspond to the arrangement of the LED unit U and the diffuser lenses 19. As illustrated in FIG. 6, each lens fitting hole 22b is formed in a circular shape with a plan view and has a diameter greater than the diffuser lens 19.

Accordingly, in arranging the chassis reflection sheet 22 in the chassis 14, each diffuser lens 19 can be fitted through each lens fitting hole 22b surely even if dimension errors occur. As illustrated in FIG. 3, the chassis reflection sheet 22 covers portions between adjacent diffuser lenses 19 and outer peripheral portions of the chassis 14. Therefore, the chassis reflection sheet 22 reflects light directing toward the portions toward the optical member 15 side. As illustrated in FIGS. 4 and 5, the outer peripheral portions of the chassis reflection sheet 22 are lifted up so as to cover the side plates 14c and the receiving plates 14d of the chassis 14 and the portions of the chassis reflection sheet 22 placed on the receiving plates 14d are sandwiched between the chassis 14 and the optical member 15. A portion of the chassis reflection sheet 22 connecting the main body 22a and each of the portions placed on the receiving plates 14d is slanted.

Figure 7:
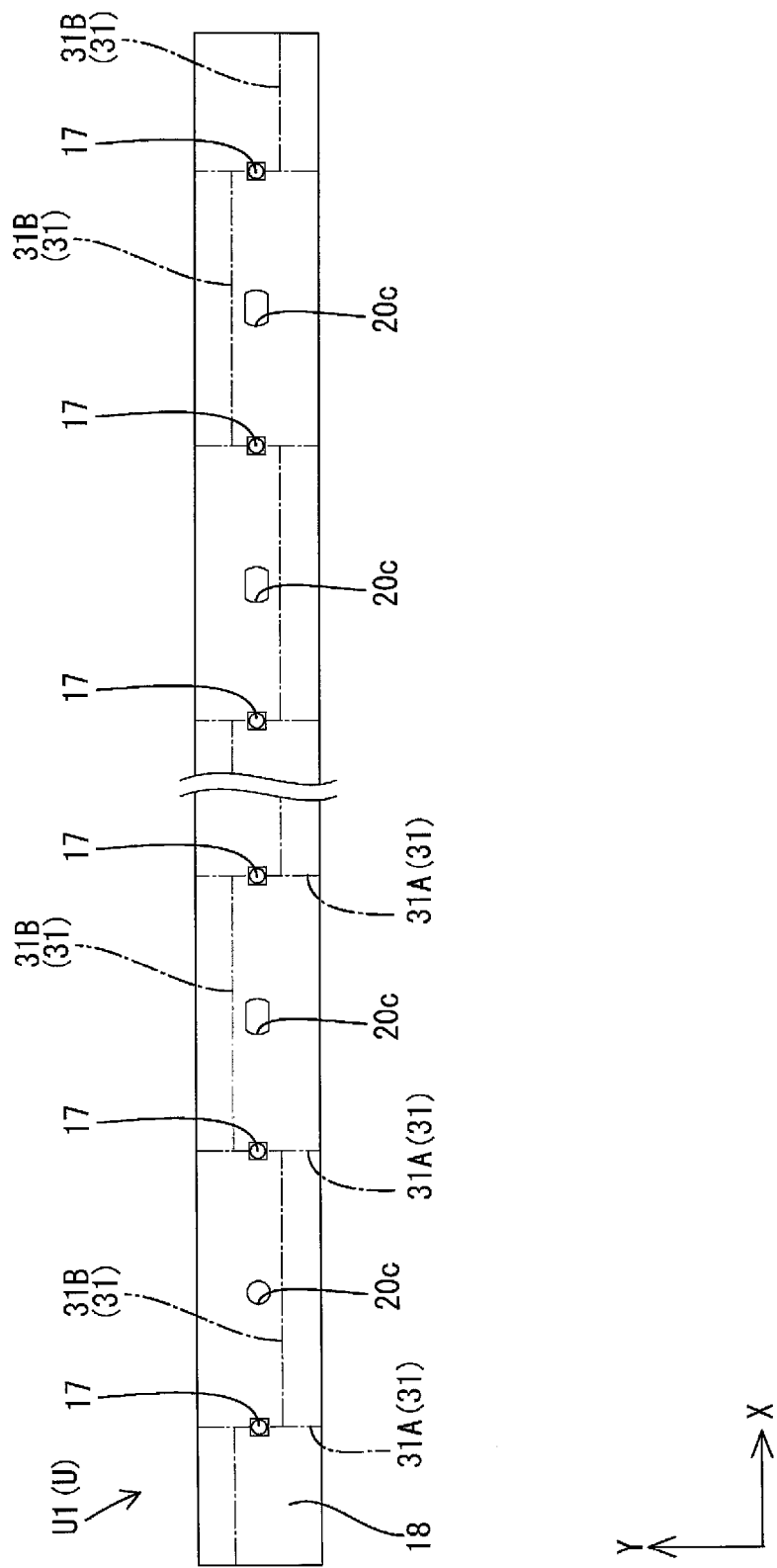
FIG. 7 is a plan view illustrating an LED unit.

Next, the LED units U will be explained in detail. As illustrated in FIG. 3, the LED unit U is formed in an elongated shape in the X-axis direction. A plurality of LED units U (in the present embodiment, nine units) are arranged in the Y-axis direction. As illustrated in FIGS. 6 and 7, the LED unit U mainly includes the LEDs 17 (light sources), an LED board 18 (a board) on which the LEDs 17 are mounted. The LED unit U further includes the diffuser lenses 19 and the board reflection sheet 23. The diffuser lenses 19 are mounted on the LED board 18 corresponding to LEDs 17, respectively. Each component of the LED unit U will be explained in detail. FIG. 7 illustrates the LED unit U from which the diffuser lenses 19 and the board reflection sheet 23 are detached.

The LED 17 is a point light source formed in a point-like shape in a plan view. A plurality of LEDs 17 (in the present embodiment, seventeen) are arranged in a long side (the X-axis direction) of the LED board 18. As illustrated in FIG. 6, the LED 17 is configured by sealing an LED chip with a resin material onto a base board that is fixed to the LED board 18. The LED chip that is mounted on the base board has one main light emission wavelength and specifically, the LED chip that emits a single color of blue is used. On the other hand, a fluorescent material is dispersed in the resin material that seals the LED chip therein. The fluorescent material converts blue light emitted from the LED chip into white light. This enables the LED 17 to emit white light.

As illustrated in FIG. 6, the LED 17 is a top-type LED that has a light emitting surface 17a on a surface opposite from the mounting surface that is to be mounted to the LED board 18 (a surface that faces the front-surface side). A light axis LA of light emitted from the LED 17 substantially matches the Z-axis direction (a direction perpendicular to a main plate surface of the liquid crystal panel 11 and the optical member 15). Light emitted from the LED 17 radiates three-dimensionally around the light axis LA within a specified angle range and the directivity thereof is higher than that of cold cathode tubes. Namely, angle distributions of the LED 17 show a tendency that the emission intensity of the LED 17 is significantly high along the light axis LA and sharply decreases as the angle to the light axis LA increases.

As illustrated in FIGS. 3 and 7, the LED board 18 is formed a rectangular elongated shape along the X-axis direction in a plan view, and the LED board 18 is housed in the chassis 14 with extending along the bottom plate 14a such that a long-side direction of the LED board matches the X-axis direction and a short-side direction thereof matches the Y-axis direction. A connector portion 18a is provided at each end of the LED board 18 in the long-side direction.

The diffuser lens 19 is made of a synthetic resin (such as polycarbonate or acrylic) that is substantially transparent (has high light transmission) and has refraction index higher than air. As illustrated in FIG. 6, the diffuser lens 19 has a specified thickness and has a lens body 19a formed in substantially a circular shape with plan view and the diffuser lens 19 is mounted to the LED board 18 so as to cover each LED 17 from the front-surface side individually and overlap each LED 17 in a plan view. Leg portions 19e protrude from the peripheral edge portion of a lower surface of the diffuser lens 19.

Three leg portions 19e are provided substantially at equal intervals (at angular intervals of approximately 120 degrees) along the peripheral edge portion of the diffuser lens 19 in a plan view. The leg portions 19e are fixed to a surface of the LED board 18 with an adhesive, thermosetting resin, and the like. An entrance side recess 19d is formed on a part of the lower surface of the diffuser lens 19 (the surface facing the LED 17 and the LED board 18) that overlaps the LED 17 with a plan view. The entrance side recess 19d is formed in substantially a conical shape that is recessed upward. Light from the LED 17 enters the entrance side recess 19d. The lower surface of the diffuser lens 19 is subject to a surface roughening treatment such as texturing.

A recess 19f that is recessed downward is formed in a center portion (the portion that overlaps the LED 17 in a plan view) of the top surface of the diffuser lens 19a (the surface facing diffuser 15a). The exit surface 19c formed by connecting two gentle circular arcs is formed on the top surface of the diffuser lens 19. Light exit from the LED 17 is refracted between an air layer and the entrance side recess 19d and between the exit surface 19c and an air layer. This causes the light to be diffused in a planer manner and radiated at a wide angle from the exit surface 19c toward the diffuser 15a. Accordingly, light emitted from the light emitting surface 17a of the LED 17 having high directivity is diffused and exits through the diffuser lens 19. Namely, light emitted from the LED 17 lowers its directivity by transmitting through the diffuser lens 19, and therefore, even if a distance between the adjacent LEDs 17 is large, the portion between the adjacent LEDs 17 is less likely to be recognized as dark portions. Accordingly, the number of LEDs 17 that are to be arranged can be decreased.

In a portion of the light exit surface 19c that overlaps the LED 17 in a plan view, the amount of light from the LED 17 is extremely great and brightness is locally high. The recess 19f is formed on the center portion of the top surface of the diffuser lens 19a and most of the rays of light emitted from the LED 17 is refracted at a wide angle to be exited therefrom or a part of the rays of light emitted from the LED 17 is reflected to the LED board 18 side. Accordingly, it is suppressed that brightness of the portion of the light exit surface 19c that overlaps the LED 17 is locally high and unevenness of brightness is less likely to occur.

The board reflection sheet 23 is made of a synthetic resin and has a surface having white color that provides excellent light reflectivity. The board reflection sheet 23 extends along the LED board 18 and has a substantially same outer shape as the LED board 18 to be formed in a rectangular shape in a plan view. As illustrated in FIG. 6, the board reflection sheet 23 is arranged to cover the front side surface of the LED board 18 that is the mounting surface where the LEDs 17 are mounted so as to cover almost its entire surface.

As illustrated in FIG. 6, the board reflection sheet 23 is provided between the diffuser lens 19 and the LED board 18. Specifically, the board reflection sheet 23 is provided in a space of the lens fitting hole 22b formed in the chassis reflection sheet 22 in a plan view. Light that enters a space corresponding to the lens fitting hole 22b is reflected to the diffuser lens 19. This improves light use efficiency and improves brightness. In other words, sufficient brightness is obtained with decreasing the number of LEDs 17 and lowering a cost.

As illustrated in FIG. 6, an LED fitting hole 23a is formed in a portion of the board reflection sheet 23 that overlaps each LED 17 on the LED board 18 in a plan view. A diameter of each LED fitting hole 23a is greater than that of the LED 17 and smaller than that of the lens fitting hole 22b of the chassis reflection sheet 22 and the diffuser lens 19.

Mounting portion fitting holes 23b are formed in the board reflection sheet 23 corresponding to the leg portions 19e. The mounting portion fitting holes 23b are through holes and each leg portion 19e is fitted through each mounting portion fitting hole 23b. Each mounting portion fitting hole 23b is formed in substantially a circular shape with a plan view so as to fit to an outer shape of the leg portion 19e. A diameter of each mounting portion fitting hole 23b is slightly greater than that of the leg portion 19e.

As illustrated in FIG. 3, a plurality of LED units U are provided in the Y-axis direction within the chassis 14. The connector portions 18a located at the ends of the chassis in the long-side direction of the LED boards 18 are electrically connected to an external control circuit (not illustrated). Accordingly, turning on and off of the LEDs 17 included in each LED board 18 can be controlled collectively by one control circuit. This achieves a low cost.

The above-described LED boards 18 are fixed to the bottom plate 14a of the chassis 14 by the holding members 20. As illustrated in FIG. 4, a holding member 20 has a disk-like holding portion 20a and a stopper 20b that projects downward from the holding portion 20a. The LED board 18 has a fitting hole 20c to which the stopper 20b is fitted. A mounting hole 14e is formed in the bottom plate 14a of the chassis 14 and communicates with the fitting hole 20c. A tip of the stopper 20b of the holding member 20 is wide and elastically deformed. After being fitted to the fitting hole 20c and the mounting hole 14e, the tip of the stopper 20b can be stopped by the rear surface side of the bottom plate 14a of the chassis 14. This allows the holding member 20 to fix the LED board 18 to the bottom plate 14a with holding the LED board 18 by the holding portion 20a.

As illustrated in FIG. 2, a support pin 27 extends outwardly from a surface of the holding member 20 located near the middle of the bottom plate 14a of the chassis 14. The support pin 27 tapers to the front-surface side and is formed in a conical shape with a rounded top. If the diffuser 15a bends or warps downwardly, the diffuser 15a comes in point contact with the top of the support pin 27. This allows the support pin 27 to support the diffuser 15a from a lower side, thereby suppressing occurrence of the brightness unevenness due to a bending or warping of the diffuser 15a.

As is explained above, the backlight device 12 of the present embodiment includes a plurality of LED units U. In the present embodiment, an LED unit base material UB is divided to manufacture a plurality of LED units U. Next, the LED unit base material UB will be described using FIGS. 8 and 9.

Figure 8:
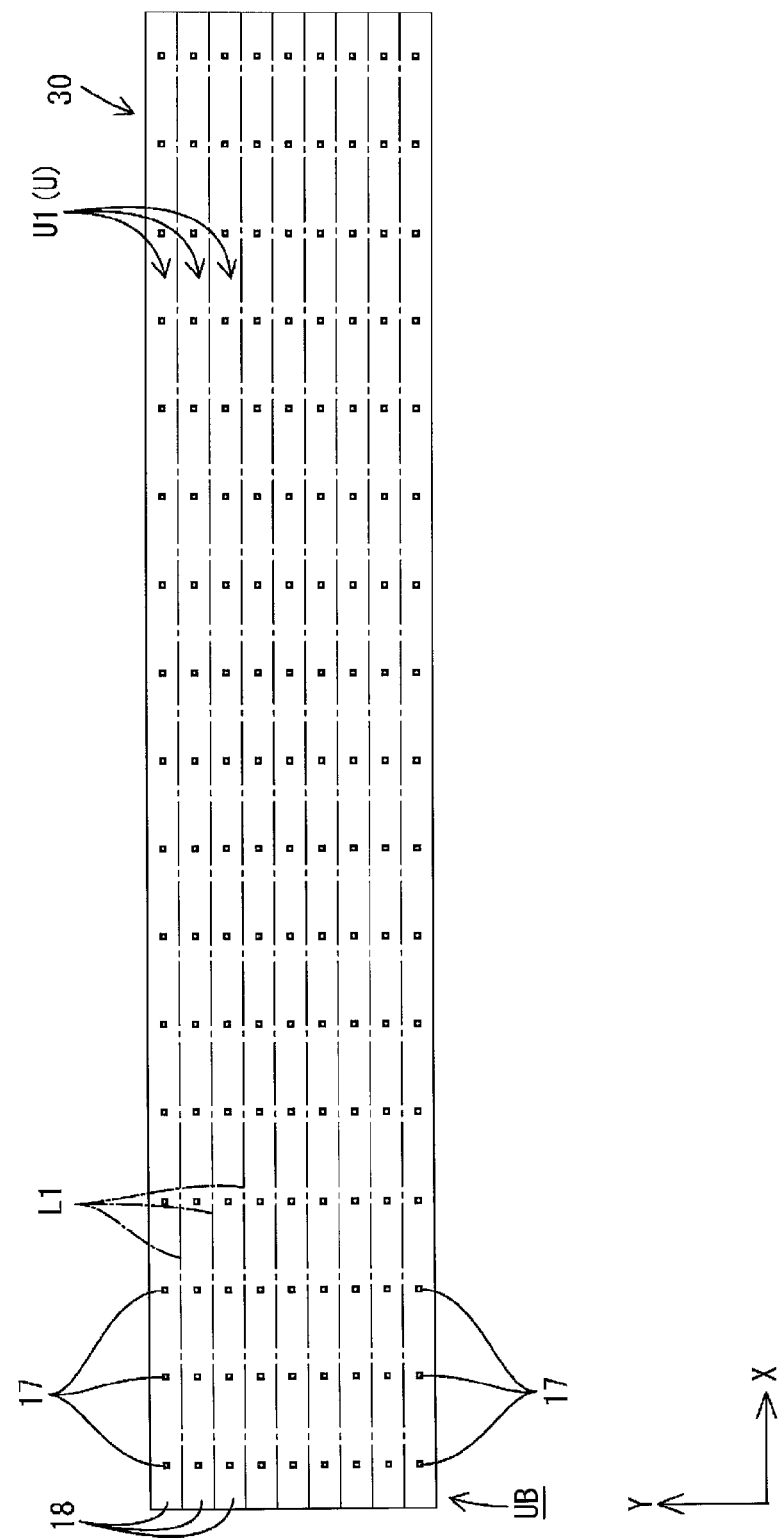
FIG. 8 is a plan view illustrating an LED unit base material.

As illustrated in FIG. 8, the LED unit base material UB of the present embodiment includes a rectangular board base material 30 and a plurality of LEDs 17 that are mounted on the board base material 30. The board base material 30 is divided into a plurality of LED boards 18. A flexible plate-shaped insulation film (e.g., a film mainly made of plastic insulating material including polyimide or polyester) is used for the board base material 30. Namely, the LED board 18 obtained by dividing the board base material 30 is a flexible board.

Figure 9:
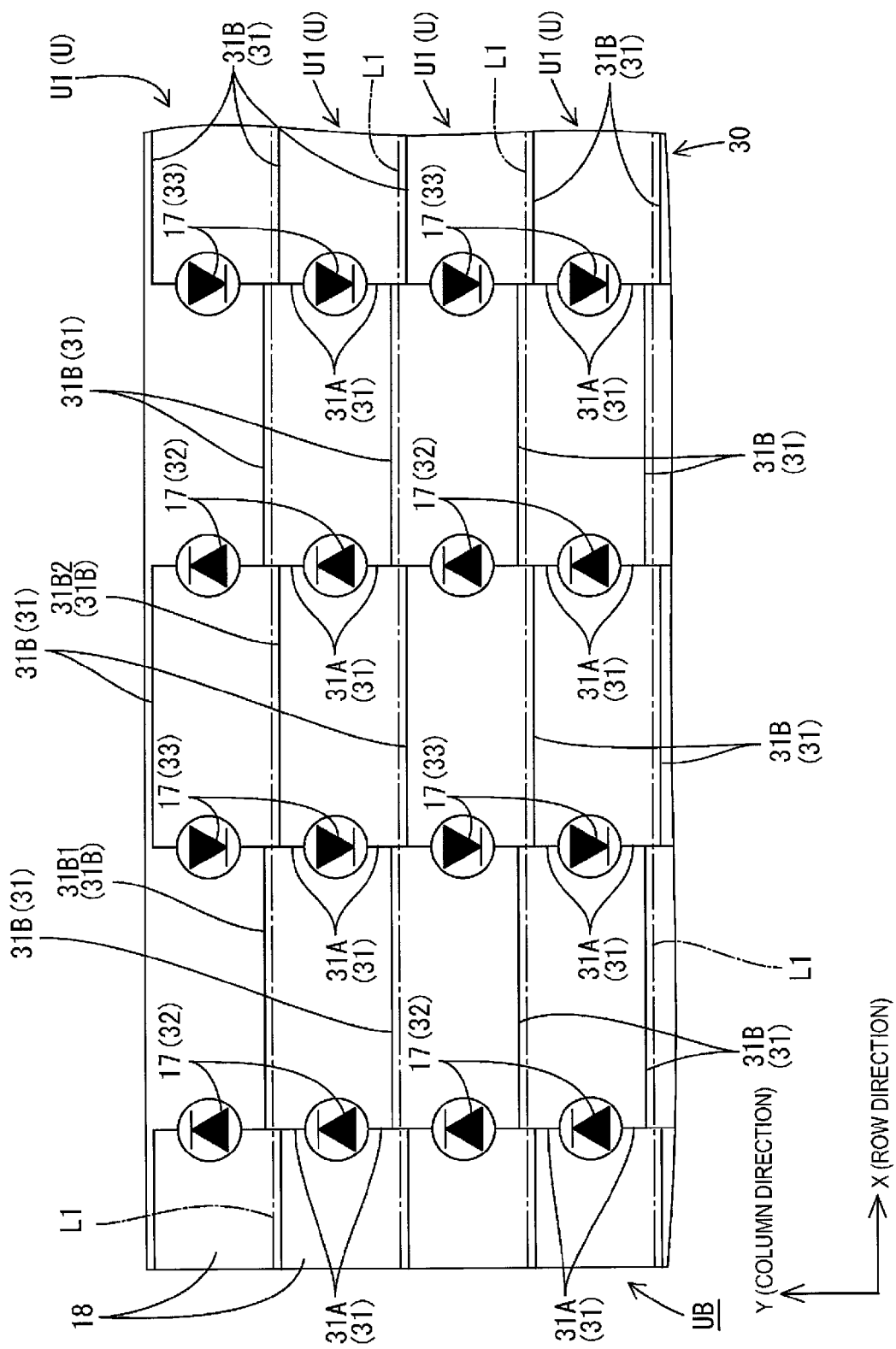
FIG. 9 is a schematic view illustrating a wiring configuration of the LED unit base material (taken along the row direction)

A plurality of LEDs 17 are provided in rows and columns on the board base material 30. In the following explanation, in FIG. 8, the top to bottom direction (the Y-axis direction) corresponds to the column direction and the right to left direction (the X-axis direction) corresponds to the row direction. The LEDs 17 are provided at equal intervals in the column direction and row direction. Arrangement of the LEDs 17 will be explained more specifically. Each column of LEDs 17 arranged in the column direction is defined as an LED group (a light emitting diode group). As illustrated in FIG. 9, the LED groups are divided into a first LED group 32 (a first light emitting diode group) and a second LED group 33 (a second light emitting diode group) depending on the direction of anodes of the LEDs 17.

In the first LED group 32, a column of the LEDs 17 is arranged such that the anodes are directed to one side in the column direction (for example, to the bottom side of FIG. 9) (in other words, the cathodes are directed to the other side in the column direction). In the second LED group 33, a column of the LEDs 17 is arranged such that the cathodes are directed to the one side in the column direction (in other words, the anodes are directed to the other side in the column direction). Accordingly, the LEDs 17 of the first LED group 32 are arranged to have a same polar direction and the LEDs 17 of the second LED group are arranged to have a same polar direction. The LEDs 17 of the first LED group 32 and the LEDs 17 of the second LED group 33 have opposite polar directions. The first LED group 32 and the second LED group 33 are arranged alternately in the row direction.

As illustrated in FIG. 9, a wiring pattern 31 made of a metallic film such as copper foil is formed on the board base material 30 and connects LEDs 17 each other electronically in series both in the row and column directions. Specifically, the wiring pattern 31 includes a wiring pattern 31A that mainly extends in the column direction and a wiring pattern 31B that mainly extends in the row direction.

Each wiring pattern 31A connects an anode of one LED 17 with a cathode of another LED 17 between the adjacent LEDs 17 in the column direction. With such a configuration, the LEDs 17 in a group that are arranged in the column direction are each connected electronically in series. Each wiring pattern 31B connects an anode of one LED 17 with a cathode of another LED 17 between the adjacent LEDs 17 in the row direction.

As is explained above, the first LED group 32 and the second LED group 33 are arranged alternately in the row direction. Namely, the adjacent LEDs 17 in the row direction have opposite polar directions. The adjacent wiring patterns 31B in the row direction (the X-axis direction) are each provided on two sides in the column direction (both top and bottom sides in the Y-axis direction) with respect to the LEDs 17 to which the adjacent wiring patterns 31B are to be connected. The LEDs 17 arranged in the row direction are connected electronically in series by the wiring patterns 31B.

As is explained above, the LED unit base material UB in the present embodiment includes a plurality of LEDs 17 that are mounted on one rectangular board base material 30. By dividing the board base material 30 into a plurality of LED boards 18A, a plurality of LED units U that include the LEDs 17 mounted on each of the LED boards 18 can be manufactured. A plurality of LEDs 17 are provided in rows and columns on the board base material 30 and each connected electronically in series in both row and column directions.

The LED unit base material UB of the present embodiment is divided into the LED units U by cutting the board base material 30 along a line between the adjacent LEDs 17. With this configuration, the LEDs 17 required for a plurality of LED units U can be mounted collectively, and this improves an operation property in manufacturing.

A plurality of LEDs 17 are connected in series in both row and column directions in the LED unit base material UB. The LED units U in each of which the LEDs 17 are connected in series can be manufactured by cutting the base board member 30 in either one of the row direction and the column direction.

Specifically, as illustrated in FIGS. 8 and 9, if the board base material 30 is cut along a line between the adjacent LEDs 17 in the column direction (the Y-axis direction) (namely, if the board base material 30 is cut along cutting lines L1 along the row direction), a plurality of LED units U (U1) extending in the row direction are formed. The cutting line L1 passes between the wiring pattern 31B (for example, 31B1) that connects the LEDs 17 and the wiring pattern 31B that is close to the wiring pattern 31B1 (for example, 31B2) and that connects the LEDs 17 that are adjacent in the column direction to those LEDs 17 that are connected by the wiring pattern 31B1. Accordingly, the wiring pattern 31B1 and the wiring pattern 31B2 are components of different LED units U1.

The cutting lines L1 are provided at equal intervals in the column direction, for example. The widths of LED boards 18 to be formed are all the same. Positions at which the cutting lines L1 are formed may be altered as long as the LEDs 17 are connected in series in the LED unit U1 after cutting (division).

Figure 10:
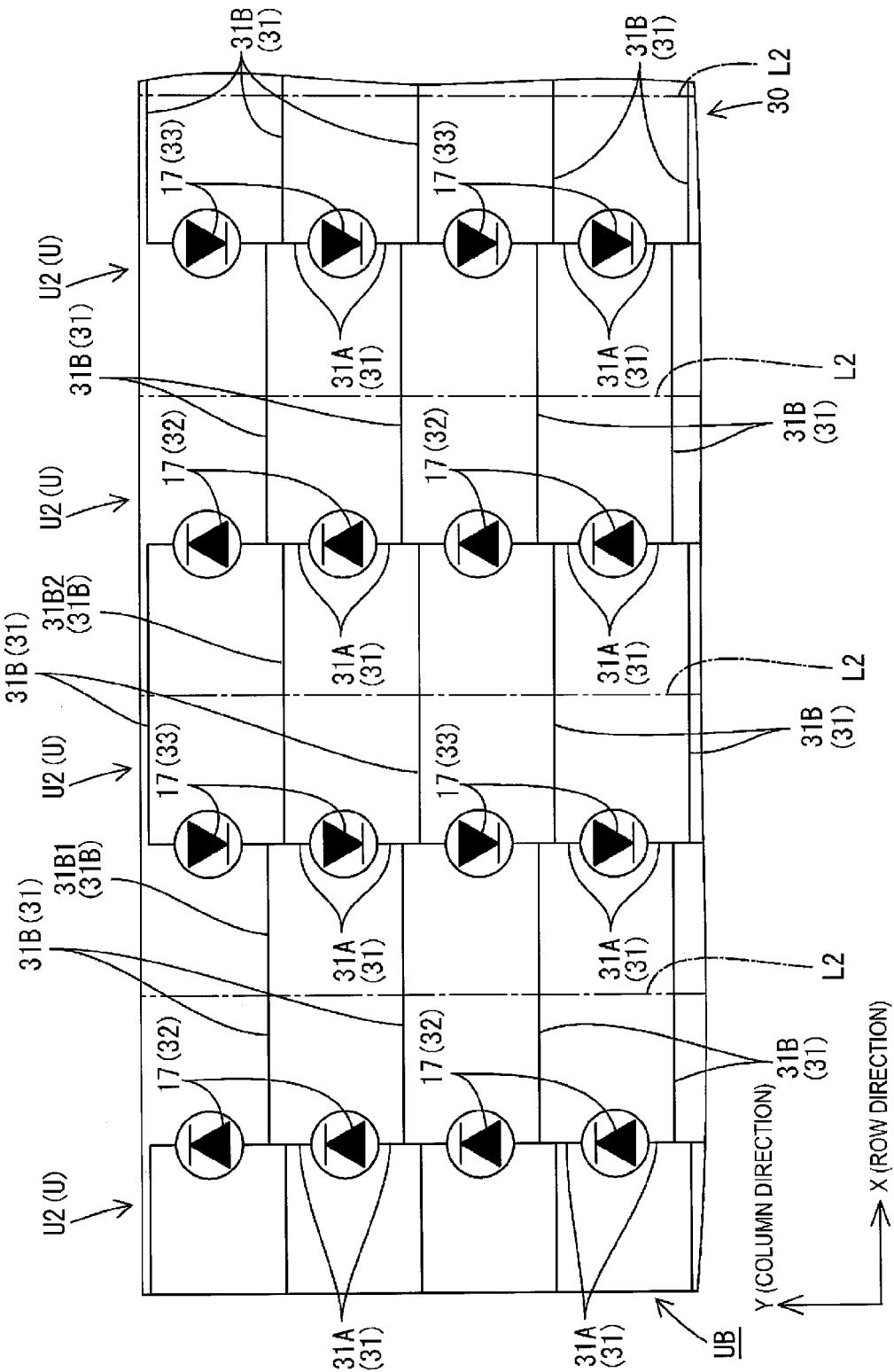
FIG. 10 is a schematic view illustrating a wiring configuration of the LED unit base material (taken along the column direction).

On the other hand, as illustrated in FIG. 10, if the board base material 30 is cut along a line between the adjacent LEDs 17 in the row direction (the X-axis direction) (namely, cut along cutting lines L2 along the column direction), a plurality of LED units U (U2) that extends in the column direction are formed. The cutting lines L2 are provided at equal intervals in the row direction, for example. Positions at which the cutting lines L2 are formed may be altered.

In the present embodiment, directions for cutting one type of LED unit base material UB are selected. This allows two types of LED unit U extending in the row or column direction to be selectively manufactured. Furthermore, the LED unit U that is formed by dividing the LED unit base material UB is cut at any length, and accordingly the length of the LED unit U can be adjusted. Thus, the LED units U having plural sizes can be manufactured from one type of the LED unit base material UB. This reduces the manufacturing cost.

A light source is the LEDs 17 (light emitting diodes). A light emitting diode group including a plurality of LEDs 17 that are arranged in the column direction includes the first light emitting diode group 32 and the second light emitting diode group 33. In the first light emitting diode group 32, anodes of the LEDs 17 are directed to one side in the column direction. In the second light emitting diode group 33, cathodes of the LEDs 17 are directed to the one side in the column direction. The first light emitting diode group 32 and the second light emitting diode group 33 are arranged alternately in the row direction.

With such a configuration, an anode of one LED 17 and a cathode of another LED 17 can be close to each other among the LEDs 17 arranged in the column direction, and therefore a wiring path for serial connection (the length of the wiring pattern 31A) can be shortened. Furthermore, with such a configuration, the anode of LED 17 and the cathode of LED 17 among the adjacent LEDs 17 in the row direction can be closer to each other compared to a configuration in which only the first light emitting diode groups 32 are arranged in the row direction. Therefore, the wiring path for serial connection (the length of the wiring pattern 31B) can be shortened.

The board base material 30 is a flexible base member. Therefore, the LED unit base material UB before dividing or the LED units U after dividing can be rolled like a reel shape, and it is easy to handle (e.g., to keep or install) the LED unit base material UB or the LED units U.

Such a flexible base member can be effectively used for a large liquid crystal display device (namely, a liquid crystal device having long LED units). If an LED unit is not flexible, the longer the LED unit is, the more difficult the handling is. In such a case, relatively short LED units that are easily handled may be prepared and they may be coupled to each other in assembling to form a long LED unit. However, with such a configuration, parts for coupling the LED units (e.g., connectors between boards) are needed and time and manpower for the coupling arise. With the configuration of the present embodiment, even if the LED unit U is long, the LED unit U is easily handled by rolling it in a reel shape or the like. The above-described configuration (the configuration in which a plurality of LED units are coupled) is not necessary and the configuration of the present embodiment is preferable. The LED unit U is flexible so as to suppress a warp in the LED board and suitable in this regard.

Other Embodiments

As describe above, the embodiment of the present invention has been described. However, the present invention is not limited to the above embodiment described in the above description and the drawings. The following embodiments are also included in the technical scope of the present invention, for example.

(1) In the above embodiment, the LED unit U is provided in the backlight device 12 that is provided directly below the liquid crystal panel 11 (a direct type). For example, the LED unit U may be provided in a backlight device that is provided laterally to the chassis 14 (a side light type).

(2) The size of the LED unit base material UB, intervals of arrangement of the LEDs 17, the number of the LEDs 17 and so on may be altered if necessary. For example, the length of an LED unit U and the number of required light sources may be altered if necessary. Furthermore, the LED unit base material UB is a rectangular shape. However, this includes a square shape.

(3) A flexible base member may be used for the board base material 30. Furthermore, an insulating material such as ceramics may be used for the board base material 30.

(4) In the above embodiment, the LEDs are used as a light source. A light source other than the LED may be used.

(5) In the above embodiment, a long side of the LED board 18 is provided to meet the X-axis direction. The long side of the LED board 18 may be provided to meet the Y-axis direction.

(6) In the above embodiment, TFTs are used as switching components of the liquid crystal display device. However, the technology described above can be applied to liquid crystal display devices including switching components other than TFTs (e.g., thin film diode (TFD)). Moreover, the technology can be applied to not only color liquid crystal display devices but also black-and-white liquid crystal display devices.

(7) In the above embodiment, the liquid crystal display device including the liquid crystal panel as a display panel is used. The technology can be applied to display devices including other types of display components.

(8) In the above embodiment, the television receiver including the tuner is used. However, the technology can be applied to a display device without a tuner.

EXPLANATION OF SYMBOLS

10: liquid crystal display device (display device), 11: liquid crystal panel (display device panel), 12: backlight device (lighting device), 14: chassis, 17: LED (light source, point light source), 18: LED board (light source board), 30: board base material, 32: first LED group (first light emitting diode group), 33: second LED group (second light emitting diode group), TV: television receiver, U: LED unit (light source unit) UB: LED unit base material (light source unit base material)

The invention claimed is:

1. A light source unit base material for manufacturing a plurality of light source units, the light source unit base material comprising:
   a board base material formed in substantially a rectangular shape; and
   a plurality of light sources provided on the board base material in a row direction and in a column direction and connected electrically in series in the row direction and in the column direction; wherein
   the light sources are light emitting diodes;
   the light emitting diodes include a first light emitting diode group and a second light emitting diode group each including a plurality of light emitting diodes that are arranged in the column direction;
   anodes of the light emitting diodes are directed to one side in the column direction in the first light emitting diode group, and cathodes of the light emitting diodes are directed to the one side in the column direction in the second light emitting diode group; and
   the first light emitting diode group and the second light emitting diode group are arranged alternately in the row direction.

2. The light source unit base material according to claim 1, wherein the board base material is a flexible base member.

3. A lighting device comprising:
   the light source units obtained by dividing the light source unit base material according to claim 1; and
   a chassis on which the light source units are mounted.

4. A display device comprising:
   the lighting device according to claim 3; and
   a display panel configured to provide display using light from the lighting device.

5. The display device according to claim 4, wherein the display panel is a liquid crystal panel using liquid crystal.

6. A television receiver comprising the display device according to claim 4.

7. The light source unit base material according to claim 1, wherein the light source units each including the light sources thereon are obtained by cutting the light source unit base material into a plurality of base boards.

8. A method of manufacturing a plurality of light source units comprising steps of:
   arranging a plurality of light sources on a substantially rectangular board base material in a row direction and in a column direction;
   connecting the light sources electrically in series in the row direction and in the column direction to obtain a light source unit base material; and
   cutting the light source unit base material into a plurality of pieces to obtain a plurality of light source units each including the light sources thereon; wherein
   the light sources are light emitting diodes;
   the arranging step further includes arranging the light emitting diodes into a first light emitting diode group and a second light emitting diode group each including a plurality of light emitting diodes arranged in the column direction;
   in the arranging step, the anodes of the light emitting diodes are directed to one side in the column direction in the first light emitting diode group, and cathode of the light emitting diodes are directed to the one side in the column direction in the second light emitting diode group; and
   the arranging step further includes arranging the first light emitting diode group and the second light emitting diode group are arranged alternately in the row direction.

9. The method according to claim 8, wherein the cutting step further includes cutting the light source unit base material along a line between the light sources in one of the row direction and the column direction.

* * * * *